(12) United States Patent
Kim

(10) Patent No.: US 6,236,817 B1
(45) Date of Patent: May 22, 2001

(54) COLOR IMAGE PRINTING APPARATUS

(75) Inventor: Woon-il Kim, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/576,177

(22) Filed: May 23, 2000

(30) Foreign Application Priority Data

May 31, 1999 (KR) .................................................. 99-19767

(51) Int. Cl.[7] .................................................. G03G 15/08
(52) U.S. Cl. .............................. 399/53; 399/58; 358/515; 358/516
(58) Field of Search .................................... 358/515, 516, 358/518, 519, 529; 395/102, 109; 399/39, 51, 53, 58, 72, 222, 223

(56) References Cited

U.S. PATENT DOCUMENTS

| | | | |
|---|---|---|---|
| 5,602,637 | * | 2/1997 | Hara et al. ............................ 399/223 |
| 5,751,434 | * | 5/1998 | Narendranath et al. ............. 358/298 |
| 5,946,450 | * | 8/1999 | Ebner et al. .......................... 395/109 |

* cited by examiner

Primary Examiner—Arthur T. Grimley
Assistant Examiner—Hoang Ngo
(74) Attorney, Agent, or Firm—Sughrue, Mion, Zinn, Macpeak & Seas, PLLC

(57) ABSTRACT

A color image printing apparatus includes a controller having a plurality of under color tables in which an under color concentration value for black developer, to be used as a substitute for color developer, corresponding to a common concentration value included in each of the three primary colors of yellow, magenta and cyan constituting a pixel display color of the original image, is set differently for a non-toner saving mode than for a toner saving mode, for outputting an under color concentration value for black determined, corresponding to the common concentration value and net concentration data for yellow, magenta and cyan which are obtained by deducting the under color concentration value from concentration data of each pixel display color of the original image, from the under color table corresponding to the toner consumption, an engine for printing a color image on a recording medium with the concentration of developer per color corresponding to the net concentration data for yellow, magenta and cyan, and the under color concentration value for black outputted from the controller, and a toner consumption saving mode selection means for selecting one of the non-toner saving mode and the toner saving mode and outputting a selected toner consumption mode selection signal to the controller.

4 Claims, 4 Drawing Sheets

COLOR IMAGE PRINTING APPARATUS

BACKGROUND OF THE INVENTION

1. Field of the Invention

The present invention relates to a color image printing apparatus, and more particularly, to a color image printing apparatus for processing original color image data using less developer to reproduce the received original color image information on a recording medium.

2. Description of the Related Art

A color image printing apparatus such as a photocopier, a printer or a facsimile machine prints an image corresponding to received original color image data on a recording medium such as a sheet of paper. The color image printing apparatus reproduces color corresponding to the original image data on a recording medium using the three primary colors of yellow, magenta and cyan as basic developers.

To reduce the amount of developer used when the original image is reproduced on a recording medium, image data of some pixels of the received original image data is converted at regular intervals to data for which developer is not consumed, and printing is performed with respect to the image data including the converted image data. However, when image data of some pixels is converted to data for which developer is not consumed, to reduced the amount of developer consumed, the quality of the image reproduced on the recording medium is lowered.

SUMMARY OF THE INVENTION

To solve the above problem, it is an objective of the present invention to provide a color image printing apparatus for processing image data so that the amount of developer used for the reproduction of an image is reduced without much lowering the quality of the original image.

Accordingly, to achieve the above objective, there is provided a color image printing apparatus which comprises a controller having a plurality of under color tables in which an under color concentration value for black developer, to be used as a substitute for color developer, corresponding to a common concentration value included in each of the three primary colors of yellow, magenta and cyan constituting a pixel display color of the original image, is set differently for a non-toner saving mode than for a toner saving mode, for outputting an under color concentration value for black determined, corresponding to the common concentration value and net concentration data for yellow, magenta and cyan which are obtained by deducting the under color concentration value from concentration data of each pixel display color of the original image, from the under color table corresponding to the toner consumption, an engine for printing a color image on a recording medium with the concentration of developer per color corresponding to the net concentration data for yellow, magenta and cyan, and the under color concentration value for black outputted from the controller, and a toner consumption saving mode selection means for selecting one of the non-toner saving mode and the toner saving mode and outputting a selected toner consumption mode selection signal to the controller.

It is preferred in the present invention that the controller comprises a first memory in which an under color concentration value corresponding to the common concentration value, to be applied in the non-toner saving mode is written, a second memory in which an under color concentration value corresponding to the common concentration value, to be applied in the toner saving mode is written, and an under color removing and black color generating portion for obtaining an under color concentration value corresponding to the common concentration value by selecting one of the first memory and the second memory according to the toner consumption mode selection signal, and generating and outputting as a pixel color data, the net concentration data per color, obtained by deducting the under color concentration value from concentration data of each of yellow, magenta and cyan forming each pixel of the original image, and the concentration data for black corresponding to the under concentration value.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
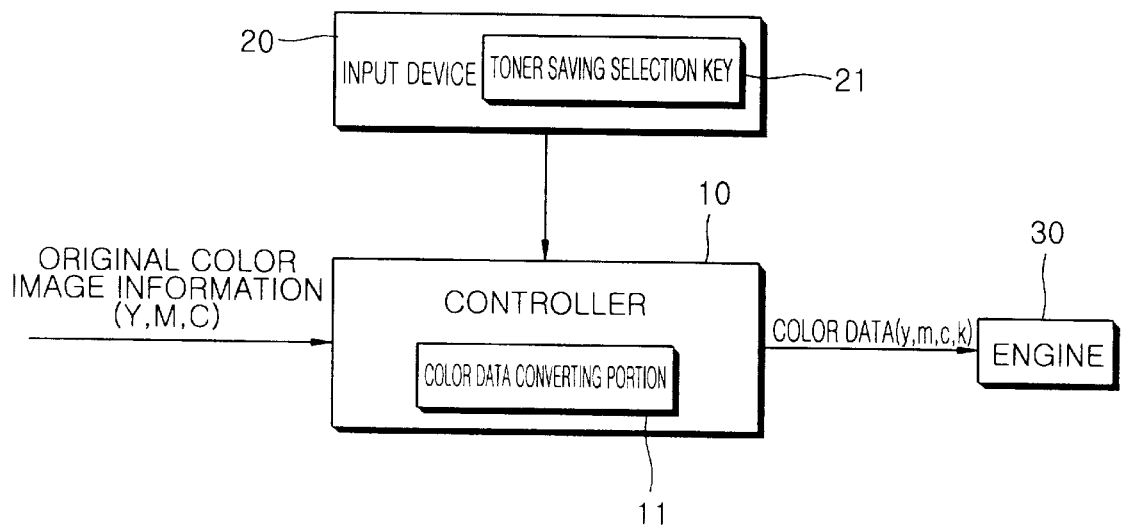
FIG. 1 is a block diagram showing a color image printing apparatus according to the present invention.

Referring to FIG. 1, a color image printing apparatus according to the present invention includes a controller 10, an input device 20 and an engine 30. The input device 20 is installed outside the main body of the printing apparatus and provided with a toner saving selection key 21 which is a toner consumption mode selection means for setting either a non-toner saving mode or a toner saving mode. The toner saving selection key 21 for setting a toner consumption mode can have various structures. For example, the toner saving selection key 21 is formed to be a button type and when the button for the toner saving selection key 21 is pressed on, a toner saving mode selection signal is output, and when the button for the toner saving selection key 21 is released, a non-toner saving mode selection signal is output.

Figure 2:
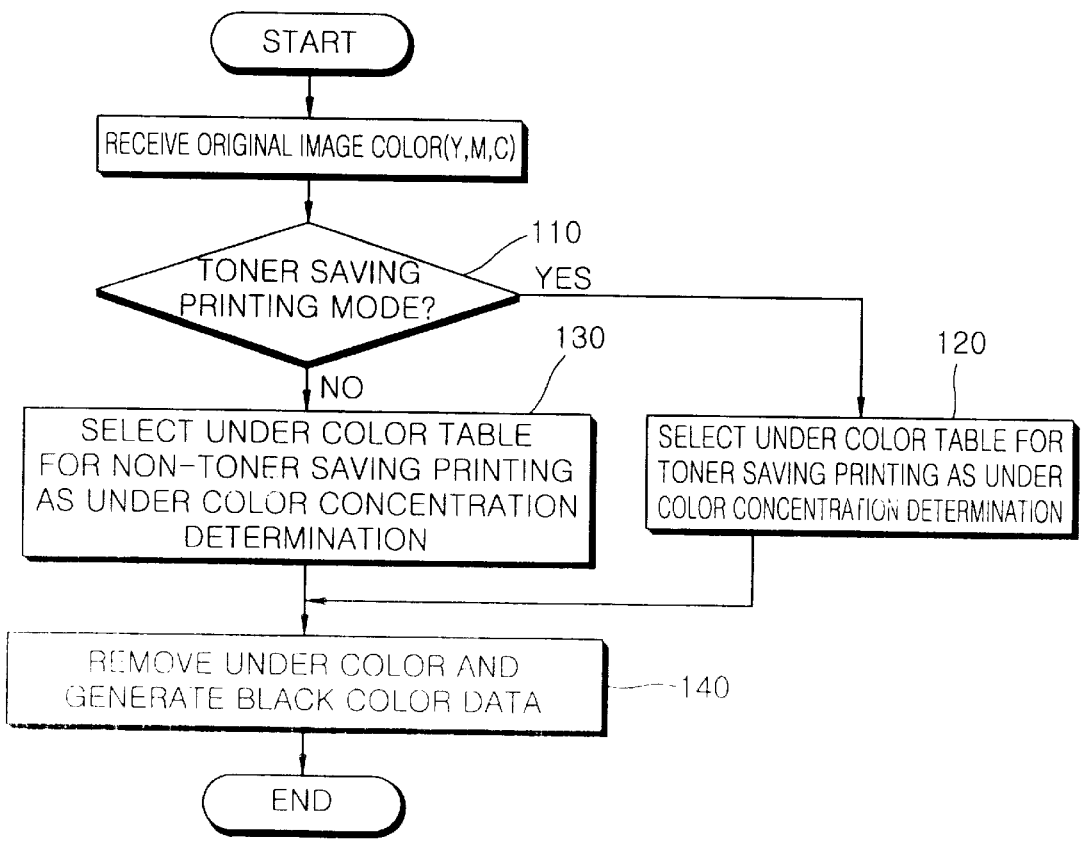
FIG. 2 is a flow chart for explaining the color data processing step of a color data converting portion of FIG. 1.

The controller 10 controls the overall system of the printing apparatus. The controller 10 processes instructions received via the input device 20 and performs conversion of the original color image information received though a communications interface from the external apparatuses, such as a computer (not shown) or a scanner (not shown), according to the selected mode, to output the converted information to the engine 30. When the received color image information is represented with color data of yellow (Y), magenta (M) and cyan (C), the controller 10 converts the received color image information to color data of yellow (y), magenta (m), cyan (c) and black (k) through a color data conversion process which is described bellow, and outputs the converted information. When the received color image information is represented with three colors of red, green and blue, the controller 10 primarily converts the color data of red, green and blue, pixel by pixel, to the three primary colors of yellow (Y), magenta (M) and cyan (C) which are complementary colors. Then, the converted color data of yellow (Y), magenta (M) and cyan (C) are converted to color data of yellow (y), magenta (m), cyan (c) and black (k) to be output. The color data converting portion 11 converts color information represented pixel by pixel with the three primary colors of yellow (Y), magenta (M) and cyan (C) to concentration data of yellow (y), magenta (m), cyan (c) and black (k). The processing step is shown in FIG. 2.

First, when the original image color, represented with concentration data of the three primary colors of yellow (Y), magenta (M) and cyan (C), is received, it is determined whether the toner saving printing mode is selected (Step 110). When it is determined that the toner saving printing mode is set in step 110, an under color table for toner saving printing is selected for under concentration determination (Step 120). When it is determined that a non-toner saving printing mode is set in step 110, an under color table for non-toner saving printing is selected for under concentration determination (Step 130).

An under concentration value which is set to correspond to a common concentration value included in the concentration data of the three primary colors of yellow (Y), magenta (M) and cyan (C), pixel by pixel, with respect to the original image color, is calculated from the under color table selected in either step 120 or step 130. Concentration data of the three primary colors of yellow (y), magenta (m) and cyan (c) generated by deducting the calculated under concentration value from the concentration data of the three primary colors of yellow (Y), magenta (M) and cyan (C) of the original color, and concentration data of black (k) corresponding to the under color value is calculated (Step 140).

The color data converting portion 11 performing the above color data conversion processing step may be embodied in various ways, for example, by being installed as a program on a memory (not shown) or in hardware.

Figure 3:
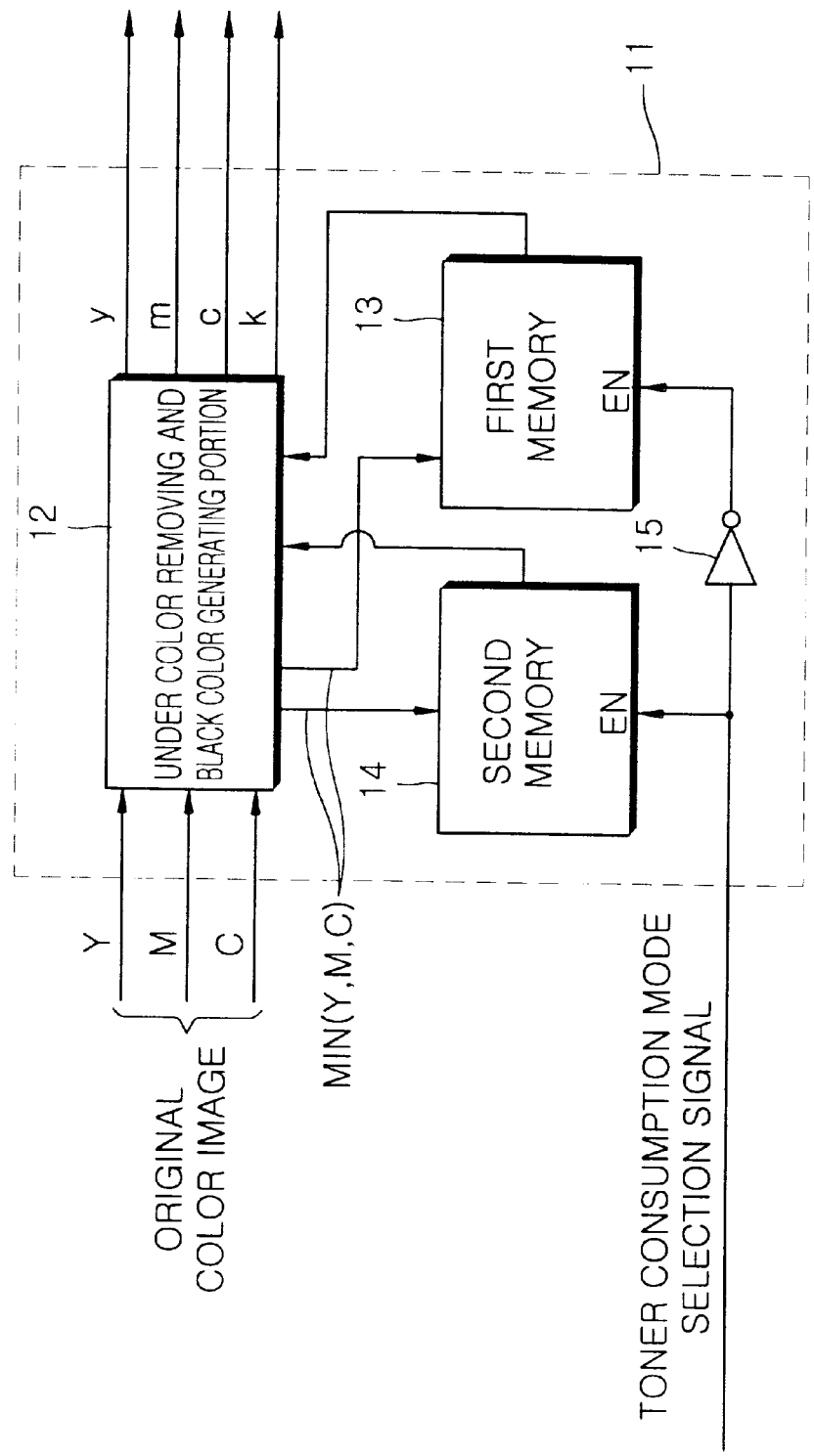
FIG. 3 is a block diagram showing a preferred embodiment of the color data converting portion of FIG. 1.

FIG. 3 shows an example of the structure of the color data converting portion embodied in hardware. Referring to the drawing, the color data converting portion 11 includes an under color removing and black color generating portion 12, a first memory 13 and a second memory 14. The under color concentration used in the description bellow signifies a black component to be applied as a substitute for part of each of yellow (Y), magenta (M) and cyan (C) components constituting the original image color.

The first memory 13 is used for the non-toner saving mode, in which under color concentration data, to be applied corresponding to a common concentration value included in the concentration data of each of yellow (Y), magenta (M) and cyan (C) colors constituting the original color, is written on a table. It is preferable that the under color table of the first memory 13 contains black substitution concentration data, requested corresponding to the common concentration value of yellow (Y), magenta (M) and cyan (C) included in the original color, in order to reproduce the original color as it is.

The second memory 14 is used for the toner saving mode, in which under color data to be applied corresponding to a common concentration value is written. The under color data written on the second memory 14 corresponding to the same common concentration value is different from the under color concentration data for the non-toner saving mode of the first memory 13. Preferably, the under color data written on the first memory 13 corresponding to the same common concentration value is set to be greater than the under color concentration value written on the under color table of the second memory 14 for the toner saving mode.

The first and second memories 13 and 14 are connected to each other so that information written on either them can be provided according to a toner consumption mode selection signal generated by operating the toner saving selection key 21. That is, for the second memory 14, the toner consumption mode selection signal is input to an enable terminal (EN) which enables reading, whereas for the first memory 13, the toner consumption mode selection signal is inverted by an inverter 15 and the inverted signal is input to an enable terminal (EN).

Different from the above configuration, the toner consumption mode selection signal may be input to the under color removing and black color generating portion 12 which then selects either of the first and second memories 13 and 14 to use.

The under color removing and black color generating portion 12 calculates a common concentration value from the original color data represented by concentration data of the three primary colors of yellow (Y), magenta (M) and cyan (C), and reads the under color concentration corresponding to the common concentration value calculated by one of the first and second memories 13 and 14 which is in an active state corresponding to the toner consumption mode selection signal. Then, net concentration data of yellow (y), magenta (m) and cyan (c) obtained by deducting the under color concentration value, read from a memory corresponding to the selected mode, from the initial concentration data of yellow (Y), magenta (M) and cyan (C) represented as pixels of the original color and black color (k), concentration data corresponding to the under color concentrations are output to the engine 30 as pixel display color information.

Figure 4:
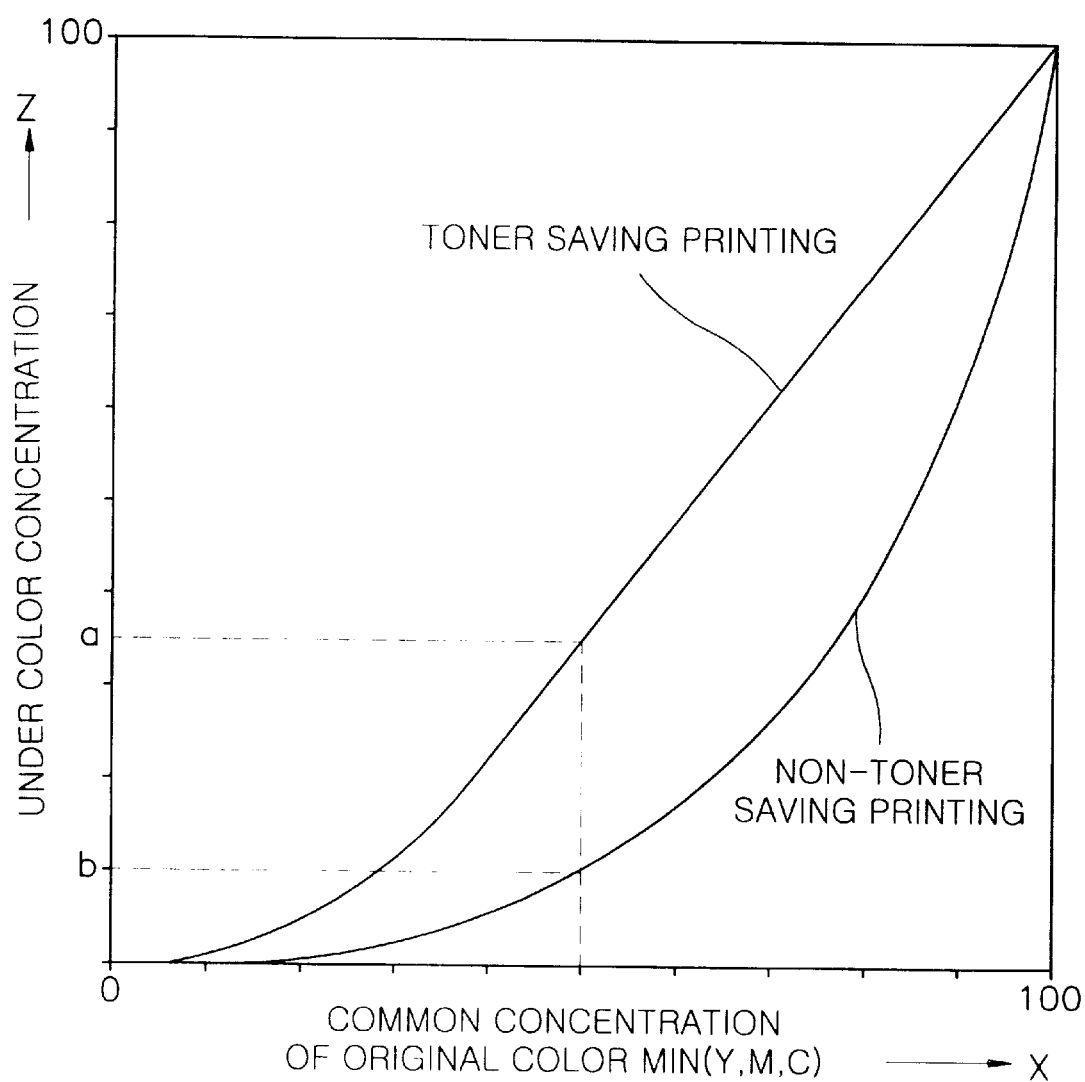
FIG. 4 is a graph indicating an example of a pattern for extracting the under color concentration from the concentration data of the three primary colors of yellow, magenta and cyan commonly included in the original image pixel color, with respect to each of a non-toner saving mode and a toner saving mode.

FIG. 4 shows an example of an under color value written to be output corresponding to the common concentration value input to each of the first and second memories 13 and 14. Referring to the drawing, a color data conversion process will be described in detail.

The X-axis of the graph of FIG. 4 indicates a common concentration value included in each of the concentration values of yellow (Y), magenta (M) and cyan (C) of the original image pixel color, assuming that each of the three primary colors of yellow (Y), magenta (M) and cyan (C) with respect to pixel color of the original image indicate that the complete pixel area is 100, that is, a scale of the minimum value Min (Y, M, C) of the concentration value of yellow (Y), magenta (M) and cyan (C). The Z-axis indicates the under color concentration. Plotted on the graph is a curve corresponding to a table for toner saving printing, and a curve corresponding to a table for non-toner saving printing, assuming that the complete pixel area is indicated to be 100. Thus, a concentration scale of 100 means that one pixel area is completely filled by corresponding color developer, while a concentration scale of 0 means that no corresponding color developer is filled in one pixel area. Also, when all common concentration values of yellow (Y), magenta (M) and cyan (C) with respect to one pixel are 100, substantially one pixel area is completely filled with black.

In the process of extracting under color concentrations, corresponding to the non-toner saving mode and the toner saving mode, from a concentration scale of normalized concentration data per color, for example, when the concentration data of each of yellow (Y), magenta (M) and cyan (C) with respect to the original image pixel color are 50, 60 and 70, respectively, a common concentration value is 50 and an under color value in an under color table for the tone saving mode corresponding to a common concentration value 50 corresponds to a. The under color concentration value in an under color table for the non-toner saving mode corresponding to a common concentration value 50 corresponds to b. Accordingly, when the concentration data of each of yellow (Y), magenta (M) and cyan (C) are input as 50, 60 and 70, respectively, and the toner saving mode is selected, the under color removing and black color generating portion 12 obtains an under color value of a corresponding to a common concentration value 50 from the under color table written on the second memory 14. Then, the under color removing and black color generating portion 12 outputs 50-a, 60-a, 70-a and a, obtained by deducting the under color concentration value a from the concentration value of yellow (Y), magenta (M) and cyan (C) per color of the original pixel, to the engine 30, as concentration data values of yellow (y), magenta (m), cyan (c) and black (k). Different from the above, when the non-toner saving mode is selected, an under color concentration value b corresponding to a common concentration value 50 is obtained from the under color table written on the first memory 13, and 50-b, 60-b, 70-b and b, obtained by deducting the under color concentration value b from the concentration value of yellow (Y), magenta (M) and cyan (C) per color of the original pixel, are output to the engine 30, as concentration data values of yellow (y), magenta (m), cyan (c) and black (k). When the color data is processed and output by the above method, part of the common concentration value included in the concentration value of yellow (Y), magenta (M) and cyan (C) is replaced by black so that the entire toner consumption amount can be reduced. In particular, as to the rate of replacement of the common concentration value of color toners by black, in a non-toner saving mode, an under color concentration value as much as the black concentration amount needed for maintaining the same quality as the original image is applied, and in a toner saving mode, the black concentration to be applied, corresponding to the common concentration value, is set to be slightly greater than that of the non-toner saving mode. As a result, in the toner saving mode, the amount of toner consumption is reduced without much lowering the quality of an image compared to the non-toner saving mode.

The engine 30 prints a color image on a recording medium with developer per color corresponding to the concentration data of yellow (y), magenta (m) and cyan (c) and the concentration data of black (k). The structure of the engine 30 differs according to the type of printing method, for example, an ink jet method, an electrophotographic method, or a thermal transfer method.

Figure 5:
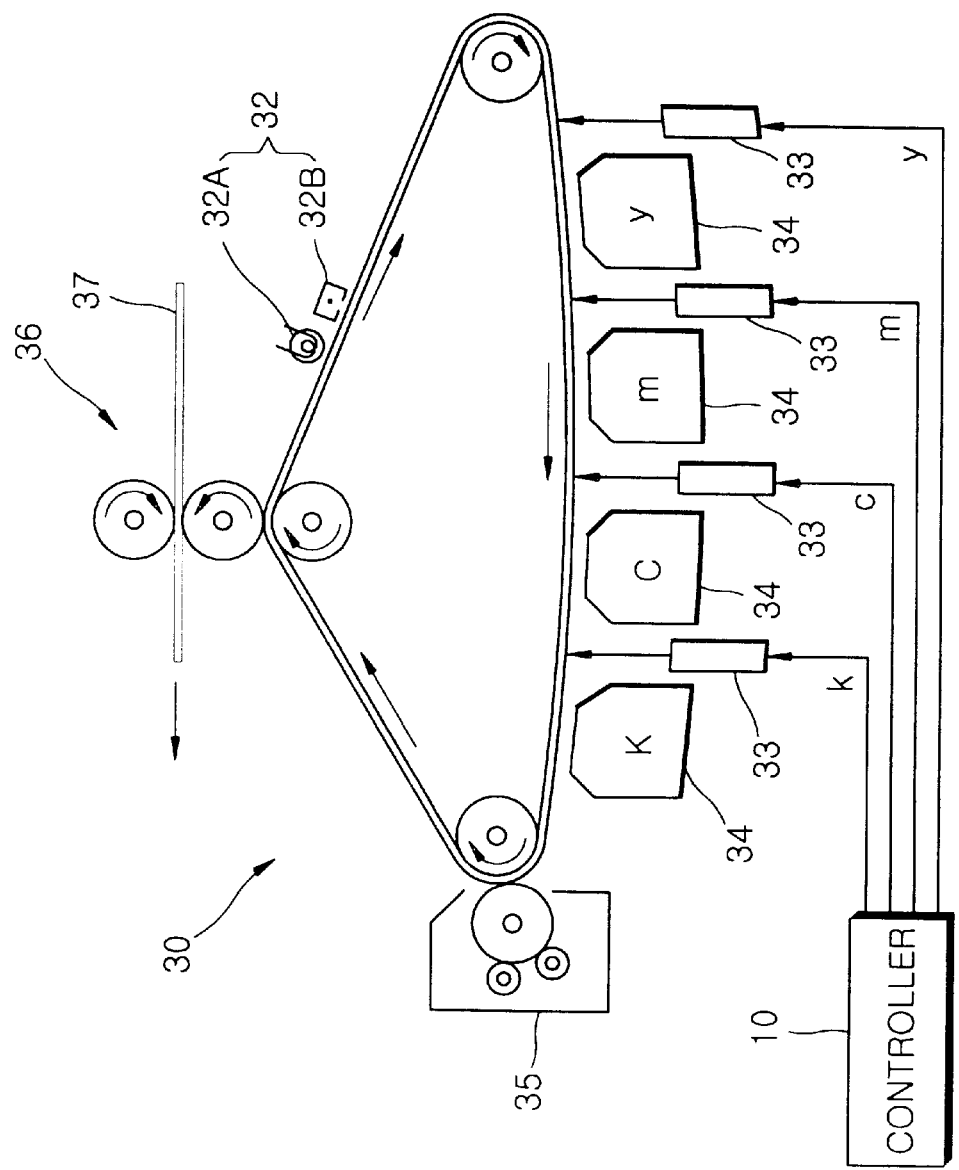
FIG. 5 is an example of the engine of FIG. 1.

FIG. 5 shows an example of an engine according to a liquid electrophotographic method. The engine 30 includes a photoreceptor web 31, a reset unit 32, a plurality of optical scanning units 33, a plurality of developing units 34, a drying unit 35 and a transfer unit 35.

The reset unit 32 includes an exposing apparatus 32a for erasing an electrostatic latent image to form a new electrostatic latent image on the photoreceptor web 31, and a charger 32b for charging the photoreceptor web 31 to a predetermined electric potential.

Four optical scanning units 33 scan light corresponding to the net concentration data of yellow (y), magenta (m) and cyan (c) and the concentration data of black (k) to the photoreceptor web 31.

Four developing units 34 provide developers of yellow (y), magenta (m), cyan (c) and black (k) to develop the electrostatic latent image formed on the photoreceptor web 31 by the optical scanning units 33.

The drying unit 35 absorbs and vaporizes a liquid carrier component irrelevant to image formation when liquid ink made by mixing toner and the liquid carrier component is used as developer.

The transfer unit 36 transfers a color image formed on the photoreceptor web 31 by the optical scanning units 33 and the developing units 34 to a provided paper 36.

Thus, for the engine 30 having the above structure, the controller 10 outputs to the optical scanning units 33 color data (y, m, c and k) corresponding to the non-toner saving mode or the toner saving mode, with respect to the original pixel color, to thus print an image corresponding to a desired mode.

As described above, according to the color printing apparatus according to the present invention, the original color image can be reproduced in a toner consumption saving mode with a reduced amount of developer, and without much lowering the print quality.

What is claimed is:

1. A color image printing apparatus comprising:

a controller having a plurality of under color tables in which an under color concentration value for black developer is set differently for a non-toner saving mode than for a toner saving mode, an engine for printing a color image on a recording medium with concentration of developer per color corresponding to a net concentration data for yellow, magenta and cyan, and an under color concentration value for black; and a toner consumption saving mode selector for selecting one of the non-toner saving mode and the toner saving mode, wherein said black developer is used as a substitute for color developer, and said black developer corresponds to a common concentration value included in each of three primary colors of yellow, magenta and cyan constituting a pixel display color of an original image, wherein said controller is capable of outputting an under color concentration value for black determined based on the common concentration value and the net concentration data for yellow, magenta and cyan, and wherein the net concentration value for yellow, magenta and cyan are obtained by deducting the under color concentration value from concentration data of each pixel display color of the original image obtained from the under color table.

2. The color image printing apparatus as claimed in claim 1, wherein the controller comprises:

a first memory in which an under color concentration value corresponding to the common concentration value, to be applied in the non-toner saving mode is written;

a second memory in which an under color concentration value corresponding to the common concentration value, to be applied in the toner saving mode is written; and an under color removing and black color generating portion for obtaining an under color concentration value corresponding to the common concentration value by selecting one of the first memory and the second memory according to the toner consumption mode selection signal, and generating and outputting as a pixel color data, the net concentration data per color and the concentration data for black corresponding to the under concentration value.

3. The color image printing apparatus as claimed in claim 2, wherein the under color concentration value, corresponding to the common concentration value, for non-toner saving printing is set to be lower than the under color value for toner saving printing.

4. The color image printing apparatus as claimed in claim 1, wherein the toner consumption mode selector is provided outside a main body so that a user can operate the consumption mode selector.

* * * * *